United States Patent Office 2,733,107
Patented Jan. 31, 1956

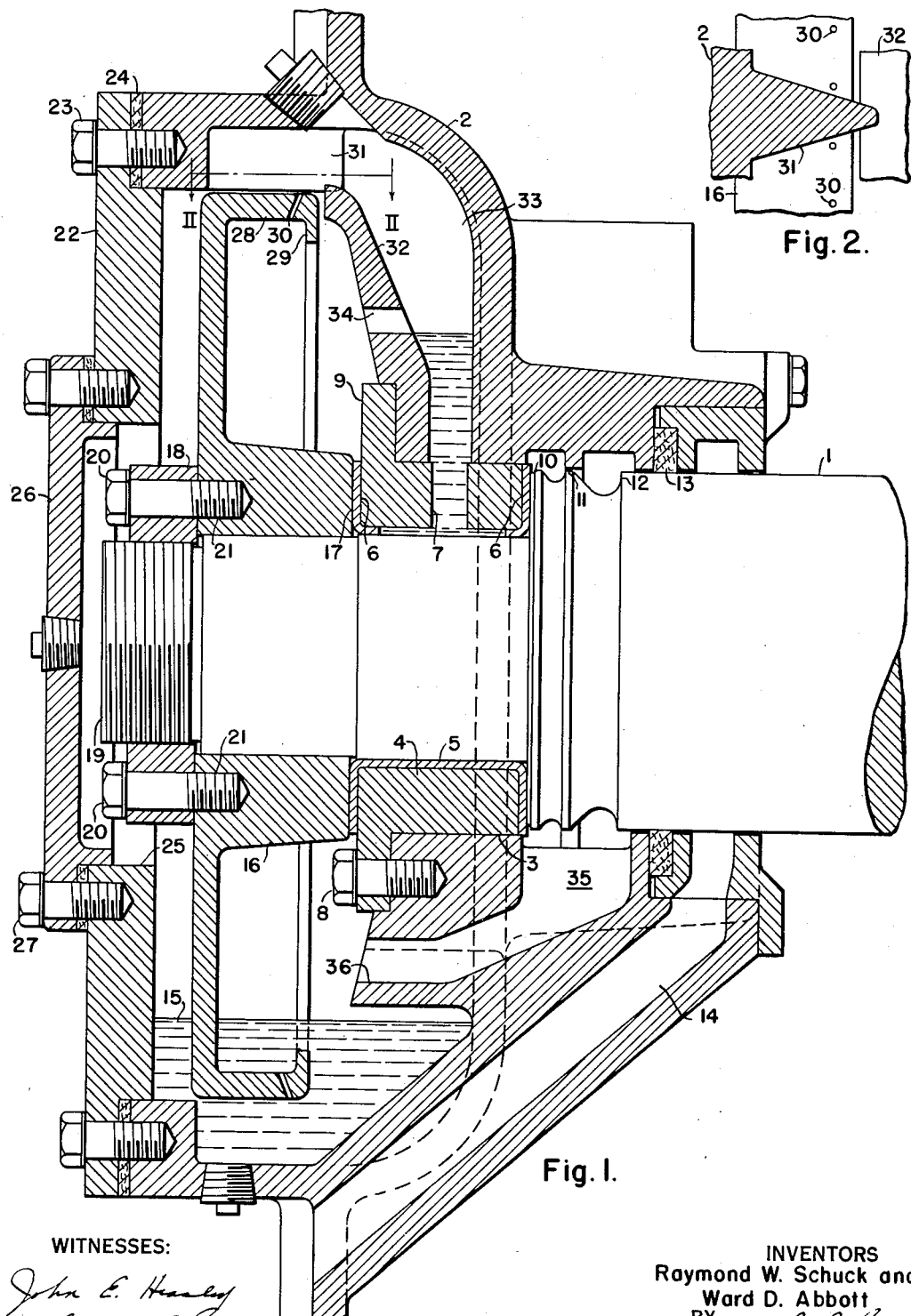

2,733,107

BEARING ASSEMBLY

Raymond W. Schuck, Buffalo, and Ward D. Abbott, Orchard Park, N. Y., assignors to Westinghouse Electric Corporation, East Pittsburgh, Pa., a corporation of Pennsylvania Application September 13, 1952, Serial No. 309,446

6 Claims. (Cl. 308—86)

The present invention relates to sleeve bearing assemblies and, more particularly, to a combined radial and thrust bearing assembly having improved lubricating means.

The principal object of the invention is to provide a sleeve bearing assembly adapted to carry radial load and also axial or thrust load, in either direction, and which is capable of successful operation when tilted at an angle as great as 25° from the vertical in any direction.

Another object of the invention is to provide a sleeve bearing assembly having a positive, self-contained lubricating system which is substantially noiseless, as compared to conventional oil rings or oil pumps, and in which leakage of oil from the bearing is prevented in any position of operation.

A further object of the invention is to provide a combined radial and thrust sleeve bearing assembly in which the amount of end float, or end play, can readily be adjusted to any desired amount.

Other objects and advantages of the invention will be apparent from the following detailed description, taken in connection with the accompanying drawing, in which:

Figure 1 is a longitudinal sectional view of a bearing assembly embodying the invention; and Fig. 2 is a fragmentary sectional view approximately on the line II—II of Fig. 1.

The invention is shown in the drawing embodied in a bearing assembly for supporting a rotatable shaft 1, which may, for example, be the shaft of an electric motor. The assembly includes a bearing housing 2, which may be secured to, or made integral with, any suitable supporting structure, such as an end bracket of an electric motor, which has not been shown since it is not a part of the invention. The housing 2 has an axial opening or bore 3 in which a sleeve bearing 4 is supported. The bearing 4 has a liner 5 of suitable bearing material, such as Babbitt metal, and the liner is extended over the radial end surfaces 6 of the bearing to provide thrust bearing surfaces at each end of the bearing. An oil hole 7 is provided in the upper part of the bearing for supplying oil to the bearing surfaces. The bearing 4 may be secured in the housing 2 in any suitable manner, as by screws 8 extending through a radial flange 9 on the bearing.

The bearing is positioned in the housing 2 so that the radial bearing surface 6 at the right-hand end of the bearing engages a shoulder 10 on the shaft which serves as a thrust shoulder to transmit axial load to the bearing. The shoulder 10 also serves as an oil throwing shoulder to throw off oil passing through the bearing and, if desired, additional oil throwing shoulders 11 and 12 may be provided on the shaft to throw off any oil which gets past the shoulder 10. A washer 13 of felt or other suitable material is preferably provided engaging the shaft beyond the shoulder 12, and any other suitable or desirable oil sealing means may be used. An air by-pass passage 14 is provided in the housing beyond the washer 13, to equalize the air pressure on opposite sides of the bearing so as to prevent any sucking of oil into the motor.

The lower part of the housing 2 is shaped to provide a reservoir for lubricating oil 15. Any suitable means may be provided, such as a conventional overflow plug, for filling the oil reservoir and maintaining the desired oil level. An impeller 16 is mounted on the shaft 1 adjacent the bearing 4, and the diameter of the impeller 16 is made such that the lower part of the impeller extends into the oil 15 in the reservoir, as shown in the drawing. The impeller 16 is secured to the shaft, by means of a key or otherwise, to rotate with the shaft and to be axially movable on the shaft. The impeller has a radial surface 17 adjacent the bearing adapted to cooperate with the bearing surface 6 at the left-hand side of the bearing to serve as a thrust surface for transmitting axial thrust to the bearing.

The impeller is adjustably secured to the shaft in a fixed axial position by means of a nut 18 threaded on a reduced end portion 19 of the shaft. The nut is secured to the impeller 16 by means of screws 20 threaded into tapped holes 21 in the impeller. A relatively large number of holes 21, such as twelve holes in a preferred embodiment, are provided, equally spaced circumferentially about the impeller, and the axial position of the impeller can readily be adjusted by turning the nut 18 to the desired position and locking it to the impeller 16 by means of the screws 20. It will be seen that the position of the impeller can be adjusted in this way in increments corresponding to $1/12$ of a turn of the nut 18, thus permitting a very accurate adjustment of the position of the impeller, which determines the amount of end play in the bearing assembly. The open end of the housing 2 is closed by a cover plate 22 which is secured to the housing in any suitable manner, as by screws 23, a gasket 24 being interposed between the plate and the housing to prevent leakage of oil. The cover plate 22 has a central opening 25 to permit access to the adjusting nut 18, and the opening 25 is normally closed by a gasketed cover 26 secured to the cover plate 22 by screws 27.

The impeller 16 has an axial flange 28 at its outer periphery and an inwardly extending peripheral lip 29. A plurality of oil holes 30 extend through the flange 28 adjacent the lip 29 for discharging oil picked up by the impeller as it rotates through the oil reservoir. The upper part of the housing 2 has a projection 31 formed integral with the housing and with an inner wall 32 which extends across the upper part of the housing. The projection 31 is substantially V-shaped, as shown in Fig. 2, and its converging sides extend toward an oil chamber 33 between the outer wall of the housing and the inner wall 32. The clearance between the outer surface of the impeller 16 and the inner surface of the projection 31 is made quite small, so that as much oil as possible will be directed against the sides of the projection. When the impeller is rotating with the shaft, a substantial amount of oil will be picked up inside the flange 28 as the impeller passes through the oil 15 in the reservoir, and the centrifugal force will cause a considerable pressure in this oil which forces it out through the oil holes 30. The holes 30 are angularly positioned so that the oil is directed against the converging sides of the projection 31 and directed into the oil chamber 33. A certain amount of oil will also be picked up by the outside of the impeller and thrown off as the impeller rotates. Some of this oil, which strikes the upper part of the housing, will also be directed into the chamber 33 by the projection 31, the remainder of the oil draining back into the reservoir.

The oil chamber 33 is generally funnel-shaped and is located immediately above the bearing 4. The bottom of the oil chamber 33 communicates directly with the oil hole 7 in the bearing 4, so that the oil which accumulates in the chamber 33 is supplied directly to the bearing. It will be understood that oil is supplied to the chamber 33 considerably faster than it escapes from the chamber to the bearing, and a drain hole 34 is, therefore, provided in the inner wall 32. The drain hole 34 is located so as to maintain a desired quantity of oil in the chamber 33 above the bearing, in order to insure that the amount of oil in the chamber will provide a sufficient head of oil at all times to provide adequate lubrication of the bearing even when the assembly is tilted at a relatively large angle, when the circulation of oil by means of the impeller may be interrupted or reduced. The drain hole 34 is positioned to maintain the necessary amount of oil for this purpose in the chamber 33, and excess oil drains off through the hole 34 back to the reservoir, preventing the accumulation of an unnecessarily large amount of oil in the chamber 33, which might lower the oil level in the reservoir to an undesirable extent.

Oil flowing from the oil chamber 33 through the oil hole 7 to the bearing 4 flows axially in both directions between the bearing and the shaft to lubricate the bearing surfaces, suitable oil grooves being provided if desired, and at the ends of the bearing, the oil is thrown radially outward to lubricate the thrust bearing surfaces. At the left-hand end of the bearing, the oil escaping between the radial surfaces of the impeller and the bearing is thrown off and drains directly back into the reservoir. At the right-hand end of the bearing, the oil thrown off by the thrust shoulder 10 drains into a drainage chamber 35, and any oil which travels along the shaft beyond the shoulder 10 is thrown off by the shoulders 11 or 12 and drains into the chamber 35. From the chamber 35, the oil flows through a drain passage 36 back to the oil reservoir.

The drain passage 36 extends substantially parallel to the axis of the bearing, so that it is substantially parallel to the surface of the oil in the reservoir when the bearing is in its normal horizontal position, and the drain passage 36 extends out over the oil reservoir to a point near the center of the reservoir, as shown in the drawing. It will be noted that because of this arrangement of the drain passage, it is impossible for oil in the reservoir to flow into the drain passage and back up against the oil sealing means even when the bearing assembly is tilted at a very substantial angle. The chamber 35 and the drain passage 36 are made relatively large so as to be capable of holding a relatively large amount of oil. Thus, if the bearing assembly is tilted at a large angle, so that oil escaping from the bearing can not drain out through the passage 36, there is sufficient space for the oil to accumulate in the chamber 35 and the passage 36 without reaching the washer 13, or other oil sealing means, so that there is no possibility of oil leakage from the bearing even during operation at an extreme angle. As soon as the assembly returns to its normal horizontal position, the oil which has accumulated in the chamber 35 immediately drains out into the reservoir.

It should now be apparent that a bearing assembly has been provided which is capable of operation when tilted at a large angle in any direction, and which has self-contained lubricating means whihc provides effective lubrication for the bearing in any position of operation. Since the oil is circulated by means of the impeller 16, the assembly is substantially noiseless in operation, as compared with conventional lubricating systems using oil rings or oil pumps. There is no risk of leakage of oil from the assembly in any operating position, and thus noiseless and leakage-free operation is obtained. A particular preferred embodiment of the invention has been shown and described for the purpose of illustration, but it will be obvious that various modifications may be made within the scope of the invention, and it is to be understood that the invention is not restricted to the specific details of construction shown but includes all equivalent embodiments and modifications.

We claim as our invention:

1. A bearing assembly for supporting a rotatable shaft, said bearing assembly comprising a housing, a sleeve bearing supported in the housing, the housing having a reservoir for lubricating oil in the lower part thereof, an impeller mounted on the shaft for rotation therewith, the diameter of the impeller being such that it extends into the oil in said reservoir, said impeller having an axial flange and having generally radial holes in the flange for discharging oil carried from the reservoir by the impeller, an oil chamber in the housing above the bearing for supplying oil to the bearing, a projection in the upper part of the housing closely adjacent the impeller for directing oil discharged from said hole into the oil chamber, and said oil chamber having an opening in one side to drain excess oil back to the reservoir, the opening being positioned to maintain a sufficient amount of oil in the chamber for adequate lubrication of the bearing when the shaft is inclined from the horizontal.

2. A bearing assembly for supporting a rotatable shaft, said bearing assembly comprising a housing, a sleeve bearing supported in the housing, the housing having a reservoir for lubricating oil in the lower part thereof, an impeller mounted on the shaft for rotation therewith, the diameter of the impeller being such that it extends into the oil in said reservoir, said impeller having an axial flange and having generally radial holes in the flange for discharging oil carried from the reservoir by the impeller, an oil chamber in the housing above the bearing for supplying oil to the bearing, a substantially V-shaped projection in the upper part of the housing closely adjacent the impeller, said V-shaped projection having converging side surfaces for directing oil discharged from said holes into the oil chamber, and said oil chamber having an opening in one side to drain excess oil back to the reservoir, the opening being positioned to maintain a sufficient amount of oil in the chamber for adequate lubrication of the bearing when the shaft is inclined from the horizontal.

3. A bearing assembly for supporting a rotatable shaft, said bearing assembly comprising a housing having a reservoir for lubricating oil in the lower part thereof, a sleeve bearing supported in the housing, said bearing having radial thrust bearing surfaces at both ends, the bearing being disposed with one of said radial bearing surfaces in position to engage a shoulder on the shaft, an impeller mounted on the shaft adjacent the bearing, said impeller having a radial surface adapted to engage the other of said radial bearing surfaces, the diameter of the impeller being such that it extends into the oil in said reservoir, said impeller having an axial flange and having generally radial holes in the flange for discharging oil carried from the reservoir by the impeller, an oil chamber in the housing above the bearing for supplying oil to the bearing, a projection in the upper part of the housing closely adjacent the impeller for directing oil discharged from said holes into the oil chamber, and said oil chamber having an opening in one side to drain excess oil back to the reservoir, the opening being positioned to maintain a sufficient amount of oil in the chamber for adequate lubrication of the bearing when the shaft is inclined from the horizontal.

4. A bearing assembly for supporting a rotatable shaft, said bearing assembly comprising a housing having a reservoir for lubricating oil in the lower part thereof, a sleeve bearing supported in the housing, said bearing having radial thrust bearing surfaces at both ends, the bearing being disposed with one of said radial bearing surfaces in position to engage a shoulder on the shaft, an impeller mounted on the shaft adjacent the bearing, said impeller having a radial surface adapted to engage the other of said radial bearing surfaces, the diameter of the impeller being such that it extends into the oil in said reservoir, means for axially adjusting the position of the impeller on the shaft with respect to the bearing, an oil chamber in the housing above the bearing for supplying oil to the bearing, a substantially V-shaped projection in the upper part of the housing closely adjacent the impeller, said projection having converging side surfaces for directing oil carried by the impeller from the reservoir into the oil chamber, and said oil chamber having an opening in one side to drain excess oil back to the reservoir, the opening being positioned to maintain a sufficient amount of oil in the chamber for adequate lubrication of the bearing when the shaft is inclined from the horizontal.

5. A bearing assembly for supporting a rotatable shaft, said bearing assembly comprising a housing, a sleeve bearing supported in the housing, the housing having a reservoir for lubricating oil in the lower part thereof, an impeller mounted on the shaft for rotation therewith, the diameter of the impeller being such that it extends into the oil in said reservoir, an oil chamber in the housing above the bearing for supplying oil to the bearing, means in the upper part of the housing closely adjacent the impeller for directing oil carried by the impeller from the reservoir into the oil chamber, said oil chamber having an opening in one side to drain excess oil back to the reservoir, the opening being positioned to maintain a sufficient amount of oil in the chamber for adequate lubrication of the bearing when the shaft is inclined from the horizontal, and means adjacent the bearing for returning oil escaping from the bearing to the oil reservoir, said oil returning means including a drain passage extending substantially parallel to the axis of the bearing above the normal level of oil in the reservoir and terminating near the center of the oil reservoir.

6. A bearing assembly for supporting a rotatable shaft, said bearing assembly comprising a housing having a reservoir for lubricating oil in the lower part thereof, a sleeve bearing supported in the housing, said bearing having radial thrust bearing surfaces at both ends, the bearing being disposed with one of said radial bearing surfaces in position to engage a shoulder on the shaft, an impeller mounted on the shaft adjacent the bearing, said impeller having a radial surface adapted to engage the other of said radial bearing surfaces, the diameter of the impeller being such that it extends into the oil in said reservoir, an oil chamber in the housing above the bearing for supplying oil to the bearing, means in the upper part of the housing closely adjacent the impeller for directing oil carried by the impeller from the reservoir into the oil chamber, said oil chamber having an opening in one side to drain excess oil back to the reservoir, the opening being positioned to maintain a sufficient amount of oil in the chamber for adequate lubrication of the bearing when the shaft is inclined from the horizontal, and means adjacent the bearing for returning oil escaping from the bearing to the oil reservoir, said oil returning means including a drain passage extending substantially parallel to the axis of the bearing above the normal level of oil in the reservoir and terminating near the center of the oil reservoir.

References Cited in the file of this patent

UNITED STATES PATENTS

| | | |
|---|---|---|
| 414,302 | Dunbar | Nov. 5, 1889 |
| 900,543 | Huff | Oct. 6, 1908 |
| 1,561,076 | Heitman | Nov. 10, 1925 |
| 1,709,442 | Schulz | Apr. 16, 1929 |
| 2,003,339 | Buckwalter | June 4, 1935 |
| 2,240,111 | Cox | Apr. 29, 1941 |
| 2,551,973 | Schuck | May 8, 1951 |